United States Patent Office 3,828,030
Patented Aug. 6, 1974

3,828,030
CHALCONE DERIVATIVES AND
PREPARATION THEREOF
Hiroaki Kinugasa, Ibaraki, Masatoshi Tsukamoto, Kyoto, Hiroyuki Mizuta, Kobe, and Hitoshi Uno, Takatsuki, Japan, assignors to Dainippon Pharmaceutical Co., Ltd., Osaka, Japan
No Drawing. Filed Dec. 10, 1970, Ser. No. 97,028
Claims priority, application Japan, Dec. 17, 1969, 44/101,906
Int. Cl. C07d 51/72, 87/32
U.S. Cl. 260—240 J                       15 Claims

ABSTRACT OF THE DISCLOSURE

ω-Aminoalkoxychalcones of the following general formula:

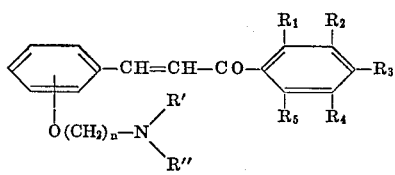

and their pharmaceutically acceptable acid addition salts having superior antihypertensive activity and therefore useful for preventing and treating hypertension in human, composition suitable for such prevention and treatment and methods for the preparation of the said ω-aminoalkoxychalcones.

---

The present invention relates to chalcone derivatives, more particularly relates to ω-aminoalkoxychalcones and their pharmaceutically acceptable acid addition salts and methods for the preparation thereof and composition containing the chalcone derivatives.

Hitherto, there has been known that some chalcone derivatives, i.e.

2-(2-dimethylaminoethoxy)-3′,4′,5′-trimethoxychalcone,
2-(2-dimethylaminoethoxy)-3′,4′-dimethoxychalcone,
2-(2-dimethylaminoethoxy)-2′,4′-dimethoxychalcone,
2-(3-dimethylaminopropoxy)-3′,4′,5′-trimethoxychalcone, and
4-(2-dimethylaminoethoxy)-3′,4′,5′-trimethoxychalcone can be prepared by reacting a dimethylaminoalkoxybenzaldehyde and a substituted acetophenone or by reacting a hydroxychalcone with a dimethylaminoalkyl chloride and that the chalcone derivatives have antihypertensive properties (U.S. Pat. No. 3,407,233). Furthermore, it has been reported that some chalcone derivatives, i.e.

2-(2-dimethylaminoethoxy)chalcone citrate,
4-(2-dimethylaminoethoxy)chalcone hydrochloride,
2-(2-diethylaminoethoxy)chalcone citrate,
4-(3-diethylaminopropoxy)chalcone hydrochloride,
4-(2-dimethylaminoethoxy)chalcone citrate,
4-(3-dimethylaminopropoxy)chalcone hydrochloride,
4-(2-dimethylaminoethoxy)chalcone hydrochloride,
4-(2-diethylaminoethoxy)chalcone citrate,
4-(2-diisopropylaminoethoxy)chalcone, and
4-(2-diethylaminoethoxy)chalcone citrate were evaluated with regard to their hypotensive potency and ability to inhibit the pressor response to epinephrine and occlusion of the carotid arteries in anesthetized normotensive dogs and they exhibited relatively low specificity, low potency and transient duration of action (Journal of the American Pharmaceutical Association, vol. 47, No. 9, pp. 640-645, 1958).

It has been studied to find out other chalcone derivatives having superior pharmacological activities. Then, there have now been found novel chalcone derivatives, more particularly novel ω-aminoalkoxychalcones having superior pharmacological activities and further new methods of the preparation thereof.

An object of the present invention is to provide novel ω-aminoalkoxychalcones and their pharmaceutically acceptable acid addition salts having superior pharmacological activities.

Another object of the present invention is to provide methods for preparing the said novel ω-aminoalkoxychalcones and their pharmaceutically acceptable acid addition salts.

Another object of the present invention is to provide pharmaceutical compositions containing the said novel chalcone derivatives.

A further object of the present invention is to provide method for preventing and treating hypertension in human by administering the said chalcone derivatives to patients.

These and other objects will more clearly appear hereinafter.

The novel chalcone derivatives of the present invention can be illustrated by the following general formula:

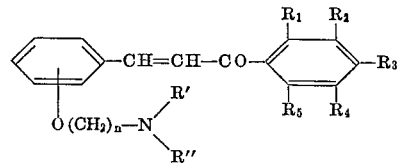

wherein $R_1$, $R_2$, $R_3$, $R_4$ and $R_5$ are, the same or different, hydrogen atom, hydroxyl group, nitro group, an alkyl group having 1 to 3 carbon atoms, a halogen atom selected from chlorine, bromine and iodine and an alkoxy group having 1 to 3 carbon atoms, $R'$ and $R''$ are, the same or different, each hydrogen atom, an alkyl group having 1 to 4 carbon atoms, allyl group or may be bound together with nitrogen atom to form a five- or six-membered heterocyclic group in which there may contain other hetero atom, such as nitrogen, oxygen and sulfur, provided that $R'$ and $R''$ are, the same or different, each an alkyl group having 2 to 4 carbon atoms, allyl group or may be bound together with nitrogen atom to form a five- or six-membered heterocyclic group in which there may contain other hetero atom, such as nitrogen, oxygen and sulfur, when at least two of $R_1$, $R_2$, $R_3$, $R_4$, and $R_5$ are methoxy group, or the group

is a five- or six-membered heterocyclic group in which there may contain other hetero atom, such as nitrogen, oxygen and sulfur, when all of $R_1$, $R_2$, $R_3$, $R_4$ and $R_5$ are hydrogen atom, $n$ is 2 or 3 and the group

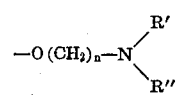

may be substituted at ortho, metha or para position, preferably at ortho position.

Suitable examples of the heterocyclic group defined above for group

may be pyrrolidino, oxazolidino, piperidino, morpholino, thiamorpholino and piperazino group which may have one or more substituents selected from an alkyl group having 1 to 3 carbon atoms, a hydroxyalky group having 1 to 3 carbon atoms, phenyl group which may be further substituted by hydroxyl group, an alkoxy group having 1 to 3 carbon atoms or a halogen atom selected from chlorine, bromine and iodine, benzyl group which may be further substituted by hydroxyl group, an alkoxy group having 1 to 3 carbon atoms or a halogen atom selected from chlorine, bromine and iodine, formyl group and the like.

Suitable compounds are one in which $R_1$ and $R_5$ are hydrogen atom and $R_2$, $R_3$ and $R_4$ are methoxy group or $R_1$, $R_2$, $R_4$ and $R_5$ are hydrogen atom and $R_3$ is a member selected from methoxy group and a halogen atom.

Suitable examples of the present ω-aminoalkoxychalcones are 2-(2-piperidinoethoxy)-4'-methoxychalcone,
2-(2-piperidinoethoxy)-3',4',5'-trimethoxychalcone,
2-(3-piperidinopropoxy)-4'-chlorochalcone,
2-[3-(N'-methylpiperazino)propoxy]-4'-chlorochalcone,
2-[3-(N'-methylpiperazino)propoxy]-4'-methoxychalcone,
2-[2-(N'-methylpiperazino)ethoxy]-4'-methoxychalcone,
2-(2-diethylaminoethoxy)-4'-methoxychalcone,
2-(3-diethylaminopropoxy)-3'-,4',5'-trimethoxychalcone,
2-[2-(N'-phenylpiperazino)ethoxy]-4'-methoxychalcone,
2-(2-morpholinoethoxy)-4'-chlorochalcone,
2-(2-dimethylaminoethoxy)-4'-chlorochalcone,
2-(2-dimethylaminoethoxy)-4'-methoxychalcone,
2-(2-diethylaminomethoxy)-4'-chlorochalcone,
2-(3-diethyaminopropoxy)-4'-methoxychalcone,
3-(2-dimethyaminoethoxy)-4'-methoxychalcone,
2-(3-morpholinopropoxy)-3',4',5'-trimethoxychalcone,
2-[2-(N'-methylpiperazino)ethoxy]-4'-chlorochalcone,
2-(2-dimethylaminoethoxy)-4'-hydroxychalcone,
2-{3-[N'-(2-hydroxyethyl)piperazino]propoxy}-4'-methoxychalcone,
2-(2-piperidinoethoxy)-4'-bromochalcone,
4-[3-(N'-methylpiperazino)propoxy]-4'-chlorochalcone,
2-(2-morpholinoethoxy)-3',4',5'-trimethoxychalcone,
2-(3-piperidinopropoxy)-3',4',5'-trimethoxychalcone,
2-(3-diethylaminopropoxy)-4'-chlorochalcone,
2-(2-diethylaminoethoxy)-4'-methylchalcone, and
2-(2-dimethylaminoethoxy)-2'-hydroxychalcone.

One method for the preparation of the present compounds (Method A) can be illustrated as follows:

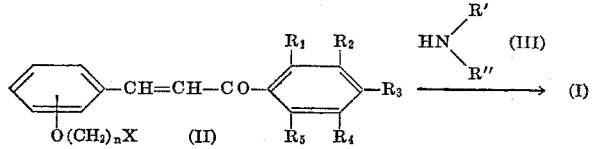

wherein X is a halogen atom selected from chlorine, bromine and iodine, tosyloxy group (i.e. p-toluenesulfonyloxy group) and hydroxyl group, and $R_1$, $R_2$, $R_3$, $R_4$, $R_5$, R', R'' and n are the same as defined above.

In Method A, an ω-substituted alkoxychalcone (II) is reacted with an amine (III) to give desired ω-aminoalkoxychalcone (I). The reaction can be carried out at room temperature or preferably at a reflux temperature in a suitable organic solvent, such as benzene, toluene and xylene or without solvent. The reaction period is a few to ten several hours, preferably 3 to 10 hours.

The starting ω-substituted alkoxychalcone (II) can be prepared by the following methods.

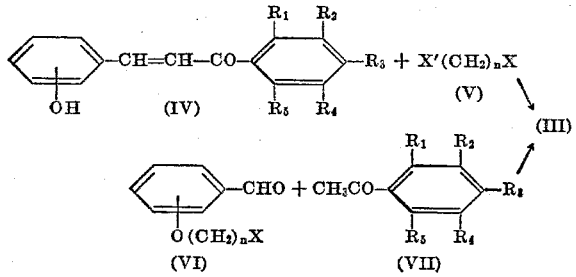

wherein X' is a halogen atom and tosyloxy group and $R_1$, $R_2$, $R_3$, $R_4$, $R_5$, R', R'', n and X are the same as defined above.

In the former method, a hydroxychalcone (IV) is reacted with an ω-substituted alkyl reagent (V), e.g. ω-chloroalkyl bromide in the presence of alkali in a suitable organic solvent, such as a lower alcohol, e.g. methanol, ethanol and propanol to give ω-substituted alkoxychalcones (II). The reaction can be carried out by heating at a reflux temperature of the solvent for a few to ten several hours, preferably 3 to 10 hours. The alkali used in the above reaction may be an alkali metal hydroxide, such as sodium hydroxide, potassium hydroxide or an alkali metal alkoxide, such as sodium methoxide, potassium methoxide, sodium ethoxide and potassium ethoxide. In the above reaction, an alkali metal salt of the hydroxychalcone can be also used instead of that the free hydroxychalcone is reacted in the presence of alkali.

In the latter method, an ω-substituted alkoxybenzaldehyde (VI) is condensed with an acetophenone (VII) in the presence of a base or an acid to give an ω-substituted alkoxychalcone (II). The condensation reaction can be smoothly carried out at room temperature or preferably under water- or ice-cooling in an inorganic or organic solvent, such as water, methanol, ethanol, ethyl acetate, dioxane and a mixture thereof. The reaction period may be varied according to the reaction substance, but usually several ten minutes to several hours, more particularly 1 to 5 hours. The base used in the reaction may preferably be an inorganic base, such as an alkali metal hydroxide, e.g. sodium hydroxide and potassium hydroxide and an alkali metal alkoxide, e.g. sodium methoxide, sodium ethoxide, potassium methoxide and potassium ethoxide, an organic base, such as trimethylamine and triethylamine and the like, and the acid may be an inorganic acid, such as hydrochloric acid, sulfuric acid, nitric acid and the like.

According to the present condensation reaction, the ω-substituted alkoxychalcones (II) can be obtained in high yield and readily precipitated and then isolated from the solvent in a form of high purity. Thus obtained compounds (II) can be therefore used in next step without further purification.

When X group of thus obtained compounds (II) is hydroxyl group, they may be further subjected to halogenation or tosylation to give the compounds, in which X is a halogen atom or tosyloxy group, by conventional methods, e.g. by reaction with a halogenating agent, such as thionyl chloride or tosyl chloride.

The starting ω-substituted alkoxybenzaldehyde (VI) of the latter method can be readily prepared by reacting a hydroxybenzaldehyde with corresponding ω-substituted alkyl reagent (V), e.g. ω-chloroalkyl bromide at a reflux temperature for several to ten several hours in a suitable solvent, such as methanol, ethanol, benzene and toluene in the presence of alkali, such as sodium, potassium, sodium hydroxide, potassium hydroxide, sodium hydride and sodium amide.

Another method for the preparation of the present compounds (Method B) can be illustrated as follows:

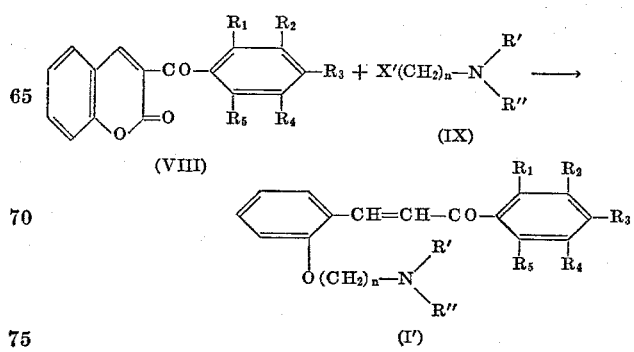

wherein $R_1$, $R_2$, $R_3$, $R_4$, $R_5$, $R'$ $R''$, $n$ and $X'$ are the same as defined above.

According to this method B, a benzoylcoumarin (VIII) is reacted with an ω-aminoalkyl halide (IX) in the presence of alkali in a suitable organic solvent to give the desired compound (I'). The reaction can be carried out by heating at a reflux temperature of the organic solvent for a few to ten several hours, preferably 3 to 10 hours.

The alkali used in the above reaction may preferably be an alkali metal alkoxide, such as sodium methoxide, potassium methoxide, sodium ethoxide and potassium ethoxide and an alkali metal hydroxide, such as sodium hydroxide and potassium hydroxide and the like, and the organic solvent may be benzene, toluene, xylene, dioxane, tetrahydrofuran, dimethylformamide and the like.

The starting benzoylcoumarin (VIII) can be prepared by reacting a lower alkyl ester of the corresponding benzoylacetic acid and salicylaldehyde in the presence of a secondary amine in an organic polar solvent. The reaction can be carried out by heating at a reflux temperature of the solvent for several ten minutes to several hours. The secondary amine may be dimethylamine, dipropylamine, dibutylamine, pyrrolidine, piperidine and the like, and the polar solvent may be alcohols, such as methanol, ethanol, propanol and butanol, pyridine, 1,2-dimethoxyethane and the like.

Alternatively, the present compounds can be prepared by the following methods (Methods C and D) which have been known in the above described U.S. Pat. No. 3,407,233. These methods are illustrated as follows, respectively.

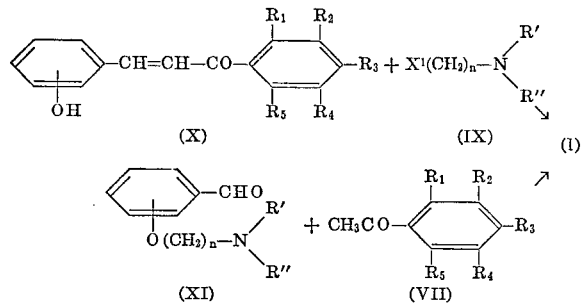

wherein $R_1$, $R_2$, $R_3$, $R_4$, $R_5$, $R'$, $R''$, $n$ and $X'$ are the same as defined above.

In the former method (Method C), a hydroxychalcone (X) is reacted with an ω-aminoalkyl halide (IX) in the presence of alkali in a suitable organic solvent to give the desired compound (I).

The reaction can be carried out by heating at a reflux temperature of the solvent for a few to several hours. The alkali used in the above reaction may be an alkali metal hydroxide, such as sodium hydroxide and potassium hydroxide, sodium hydride, sodium amide, sodium and the like, and the organic solvent may be ethanol, benzene, toluene, xylene and the like.

In the latter method (Method D), an ω-aminoalkoxybenzaldehyde (XI) is condensed with an acetophenone (VII) in the presence of a base or an acid in the same manner as described in Method A, the latter method for the preparation of the starting ω-substituted alkoxychalcone (II).

In Methods C and D, it is essential to use ω-aminoalkyl compounds. Therefore, they are not necessarily preferable when the ω-aminoalkyl compounds are unavailable, for example for the preparation of ω-heterocyclic group substituted alkoxy derivatives: the group

in the formula (I) being a heterocyclic group. On the contrary, in the novel Method A, any ω-aminoalkyl compound is not used but amines themselves can be used, and therefore, various kinds of amine derivatives can be readily prepared. In Method A, there is further advantage that the ω-substituted alkoxychalcones (II) obtained by the condensation reaction can be easily isolated from the reaction mixture in good yield and in high purity, as described hereinbefore.

Furthermore, for the preparation of 3',4',5'-trimethoxychalcones, Method D is not preferable since the starting 3,4,5-trimethoxyacetophenone: $R_2$, $R_3$ and $R_4$ being methoxy group and $R_1$ and $R_5$ being hydrogen atom in formula (VII) is unavailable and it is prepared from 3,4,5-trimethoxybenzoic acid in low yield. On the other hand, in the novel Method B, 3,4,5-trimethoxyacetophenone is not used and the starting (3,4,5-trimethoxybenzoyl)coumarin can conveniently be prepared from available 3,4,5-trimethoxybenzoic acid in good yield. Therefore, the Method B is advantageous especially for the preparation of 3',4',5'-trimethoxychalcones.

When the ω-aminoalkoxychalcones (I) prepared by the above methods are a free base, they can be readily converted into their acid addition salts by a conventional method, e.g. treatment of the former with an acid in a suitable solvent, such as water, methanol, ethanol, chloroform and ether. The acid may be an inorganic acid, such as hydrogen chloride, hydrogen bromide, hydrogen iodide, sulfuric acid, nitric acid and phosphoric acid and an organic acid, such as maleic acid, succinic acid, oxalic acid, citric acid, malic acid, tannic acid and gallic acid.

According to the present invention, the known chalcone derivatives, i.e. 2(or 4)-dimethylaminoalkoxy di(or more) methoxychalcone and 2(or 4)-dialkylaminoalkoxychalcone which may be illustrated by the following formula:

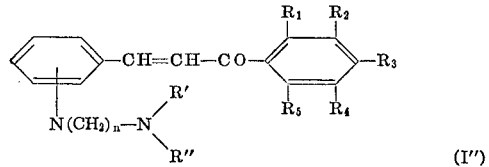

wherein $R'$ and $R''$ are methyl group when at least two of $R_1$, $R_2$, $R_3$, $R_4$ and $R_5$ are methoxy group and the remainder are hydrogen atom or $R'$ and $R''$ are a lower alkyl group when all of $R_1$, $R_2$, $R_3$, $R_4$ and $R_5$ are hydrogen atom can be also advantageously prepared by the present novel Methods A and B. Therefore, the present invention provides also the novel methods for the preparation of the known chalcone derivatives.

The ω-aminoalkoxychalcones (I) and their pharmaceutically acceptable acid addition salts of the present invention possess superior pharmacological activities, e.g. antihypertensive, vasodilative activities, and are therefore useful as medicaments, especially for prevention and treatment of hypertension.

The ω-aminoalkoxychalcones (I) and their pharmaceutically acceptable acid addition salts can be administered orally by conventional methods with conventional pharmaceutical carriers in human.

They can be used in a form of tablets, capsules, powders or in a liquid form, such as solutions, emulsions, suspensions or syrups.

In the preparation of tablets containing the present compounds there may be employed various non-toxic pharmaceutical carriers which are compatible with the present compounds, such as excipients, e.g. microcrystalline cellulose, lactose, starch or the like, lubricants, e.g. silicic acid anhydride, magnesium stearate, talc, sodium laurylsulfate or the like and binder, e.g. starch paste, lactose, mannitol, magnesium trisilicate, gelatin or the like, as is well known in the art.

When they are administered in a liquid form, there can be used conventional liquid carrier such as water.

For prevention and treatment of hypertension in human the required dosage per day of the present compounds is within the range of 0.01 to 100 mg. per kg. of body weight when administered orally. A preferred dosage per day is within the range of 0.1 to 30 mg. per kg. of body weight, more particularly the range of 1 to 10 mg. per kg. of body weight. Consequently, the present pharmaceutical composition for preventing and treating hypertension in adults contains the present compounds in the range of about 100 to 300 mg. per daily dosage unit.

The total dosage may be administered in smaller portions three or four times daily as determined by the attending physician.

The preparation of the present ω-aminoalkoxychalcones and their pharmaceutically acceptable acid addition salts are set out in the following examples which are illustrative but not limiting.

EXAMPLE 1

(a) To a solution of 13.0 g. of 2-hydroxy-4'-chlorochalocone in 30 ml. of methanol was added dropwise a solution of 2.2 g. of sodium hydroxide in 70 ml. of methanol. After the mixture was refluxed for 10 minutes, 28 g. of 1-chloro-2-bromoethane was added and the mixture was further refluxed for 5 hours. After filtering the reaction mixture, the filtrate was distilled to remove methanol and the unreacted 1-chloro-2-bromoethane and then extracted with ether. The ether extract was washed with dilute hydrochloric acid and water, dried over anhydrous sodium sulfate and distilled to remove ether. Thus obtained residue was recrystallized from ethanol to give 14.2 g. of 2-(2-chloroethoxy)-4'-chlorochalcone having a melting point of 114–116° C.

(b) To a solution of 3.2 g. of 2-(2-chloroethoxy)-4'-chlorochalcone obtained above in 20 ml. of toluene was added 2.2 g. of N-methylpiperazine. The mixture was refluxed for 6 hours. After cooling, the reaction mixture was filtered. The filtrate was repeatedly extracted several times with dilute hydrochloric acid. Thus obtained acidic solution was made alkaline with sodium carbonate and then extracted with ether. The ether extract was washed with water, dried over anhydrous sodium sulfate and treated with a saturated solution of hydrogen chloride in ether. The resulting precipitate was filtered. The residue was recrystallized from ethanol to give 2.9 g. of 2-[2-(N'-methylpiperazino)ethoxy]-4' - chlorochalcone dihydrochloride (Compound No. 1) having a melting point of 216–223° C.

Elementary analysis for $C_{22}H_{25}N_2O_2Cl \cdot 2HCl$.—Calculated: C, 57.72%; H, 5.94%; N, 6.12%; Cl, 23.23%. Found: C, 57.37%; H, 6.07%; N, 6:50%; Cl, 23.07%.

EXAMPLE 2

(a) To a solution of 5.1 g. of 2-hydroxy-4'-methoxychalcone in 50 ml. of methanol was gradually added dropwise a solution of 0.8 g. of sodium hydroxide in 20 ml. of methanol. After the mixture was refluxed for 10 minutes, 11.5 g. of 1-chloro-2-bromoethane was further added dropwise and then the mixture was refluxed for 5 hours. The reaction mixture was distilled off under reduced pressure to remove methanol and unreacted 1-chloro-2-bromoethane. The residue was extracted with ether. The extract was washed with dilute hydrochloric acid, 5% aqueous sodium carbonate and water in order, dried and distilled to remove ether. The resulting residue was recrystallized from ethanol to give 4.8 g. of 2-(2-chloroethoxy)-4'-methoxychalcone having a melting point of 109–110° C.

(b) To a solution of 3.2 g. of 2-(2-chloroethoxy)-4'-methoxychalcone obtained above in 30 ml. of toluene was added 3.6 g. of N-phenylpiperazine and the mixture was refluxed for 5 hours. After cooling, the reaction mixture was filtered. The filtrate was repeatedly extracted several times with dilute hydrochloric acid. Thus obtained acidic solution was made alkaline with sodium carbonate and extracted with ether. The ether extract was washed with water, dried over anhydrous sodium sulfate and then treated with a saturated solution of hydrogen chloride in ether. The resulting precipitate was filtered and then dissolved into chloroform. The chloroform solution was washed with water, dried over anhydrous sodium sulfate and then distilled off to remove chloroform. The residue was recrystallized from ethanol to give 2.8 g. of 2-[2-(N'-phenylpiperazino)ethoxy] - 4' - methoxychalcone hydrochloride (Compound No. 2) having a melting point of 192–195° C.

Elementary analysis for $C_{28}H_{30}N_2O_3 \cdot 2HCl$.—Calculated: C, 70.06%; H, 6.51%; N, 5.84%; Cl, 7.40%. Found: C, 70.19%; H, 6.68%; N, 6.06%; Cl, 7.71%.

EXAMPLES 3–28

In the same manner as described in Examples 1 and 2, there were prepared various ω-disubstituted aminoalkoxychalcones having the following formula:

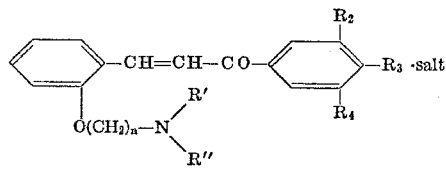

They are shown in Table I.

TABLE I

| Ex. No. | Groups -N(R'/R'') | $R_2$ | $R_3$ | $R_4$ | $n$ | Salt | Melting point (° C.) | | Elementary analysis C | H | N | Cl | Br | Comp. No |
|---|---|---|---|---|---|---|---|---|---|---|---|---|---|---|
| 3 | -N⟨⟩ | H | OCH₃ | H | 3 | HCl·H₂O | 98–100 | C* F | 67.97 67.57 | 7.37 7.99 | 3.23 2.80 | 8.36 7.46 | | 3 |
| 4 | -N⟨⟩N—CH₂CH₂OH | H | OCH₃ | H | 3 | 2HCl | 223–225 | C F | 60.48 60.33 | 6.70 7.07 | 5.64 5.49 | 14.28 14.35 | | 4 |
| 5 | -N⟨⟩N—CH₃ | H | OCH₃ | H | 3 | 2HCl·1/2H₂O | 210–211 | C F | 60.50 60.60 | 6.98 7.53 | 5.88 5.74 | 14.88 15.01 | | 5 |
| 6 | Same as above | H | Cl | H | 3 | 2HCl·1/3H₂O | 225–229 | C F | 57.81 58.01 | 6.26 6.41 | 5.86 5.79 | 22.26 21.76 | | 6 |
| 7 | -N⟨⟩N—CH₂—⟨⟩—OCH₃ | H | Cl | H | 3 | 2HCl | 220–223 | C F | 62.45 62.45 | 5.94 6.23 | 4.86 4.61 | 18.44 18.36 | | 7 |
| 8 | -N(CH₃)(CH₃) | OCH₃ | OCH₃ | OCH₃ | 3 | HCl | 170–173 | C F | 63.35 63.22 | 6.96 7.13 | 3.21 3.16 | 8.13 8.35 | | 8 |
| 9 | Same as above | OCH₃ | OCH₃ | OCH₃ | 2 | HCl | 167–169 | C F | 62.63 62.40 | 6.69 7.00 | 3.32 3.00 | 8.40 8.14 | | 9 |

TABLE I—Continued

| Ex. No. | Groups −N(R')(R'') | $R_2$ | $R_3$ | $R_4$ | n | Salt | Melting point (°C.) | | Elementary analysis C | H | N | Cl | Br | Comp. No. |
|---|---|---|---|---|---|---|---|---|---|---|---|---|---|---|
| 10 | −N⟨⟩N−CH₃ | H | OCH₃ | H | 2 | 2HCl·3/2H₂O | 115–118 | C F | 57.50 57.24 | 6.92 6.99 | 5.78 6.19 | 14.76 14.81 | | 10 |
| 11 | −N⟨⟩O | H | Cl | H | 2 | HCl | 151–155 | C F | 61.77 61.51 | 5.68 5.43 | 3.43 3.20 | 17.36 17.51 | | 11 |
| 12 | −N(CH₃)₂ | H | Cl | H | 2 | HCl | 152–154 | C F | 62.30 61.89 | 5.78 6.06 | 3.82 3.56 | 19.36 19.23 | | 12 |
| 13 | Same as above | H | Cl | H | 3 | HCl | 155–157 | C F | 63.16 63.10 | 6.10 6.16 | 3.68 3.38 | 18.65 18.73 | | 13 |
| 14 | do | H | OCH₃ | H | 2 | HCl | 178–180 | C F | 66.38 66.61 | 6.68 6.78 | 3.87 3.77 | 9.80 9.52 | | 14 |
| 15 | −N⟨⟩O | OCH₃ | OCH₃ | OCH₃ | 2 | HCl | 213–215 | C F | 62.13 62.10 | 6.52 6.69 | 3.02 2.90 | 7.64 7.83 | | 15 |
| 16 | −N(C₂H₅)₂ | H | OCH₃ | H | 2 | HCl | 183–185 | C F | 67.77 67.61 | 7.24 7.41 | 3.59 3.66 | 9.09 9.07 | | 16 |
| 17 | Same as above | H | OCH₃ | H | 3 | HCl | 154–155 | C F | 68.37 68.16 | 7.49 7.67 | 3.47 3.30 | 8.78 8.95 | | 17 |
| 18 | do | H | Cl | H | 2 | HCl | 145–146 | C F | 64.08 63.97 | 6.40 6.51 | 3.56 3.37 | 17.83 18.03 | | 18 |
| 19 | do | H | Cl | H | 3 | HCl | 164–165 | C F | 64.82 64.41 | 6.68 6.74 | 3.44 3.14 | 17.22 17.22 | | 19 |
| 20 | do | OCH₃ | OCH₃ | OCH₃ | 2 | COOH-COOH | 154–155 | C F | 62.02 62.16 | 6.61 6.72 | 2.78 2.90 | | | 20 |
| 21 | do | OCH₃ | OCH₃ | OCH₃ | 3 | Same | 119–121 | C F | 62.66 62.42 | 6.82 7.06 | 2.71 2.59 | | | 21 |
| 22 | −N⟨⟩ | H | OCH₃ | H | 2 | HCl | 152–154 | C F | 68.73 68.44 | 7.02 7.04 | 3.49 3.21 | 8.82 8.67 | | 22 |
| 23 | Same as above | H | Cl | H | 2 | HCl | 182–183 | C F | 64.96 64.99 | 6.20 6.35 | 3.44 3.42 | 17.47 17.50 | | 23 |
| 24 | do | OCH₃ | OCH₃ | OCH₃ | 2 | HCl | 186–187 | C F | 65.00 64.84 | 6.98 7.28 | 3.03 2.78 | 7.67 7.50 | | 24 |
| 25 | do | H | Cl | H | 3 | HCl | 208–209 | C F | 65.71 65.51 | 6.47 6.53 | 3.33 3.18 | 16.87 16.91 | | 25 |
| 26 | do | OCH₃ | OCH₃ | OCH₃ | 3 | HCl·1/2H₂O | 183–184 | C F | 64.39 64.31 | 7.27 7.50 | 2.89 2.72 | 7.31 7.35 | | 26 |
| 27 | −N⟨⟩O | H | OCH₃ | H | 3 | HCl | 161–162 | C F | 66.10 65.96 | 6.75 6.90 | 3.35 3.09 | 8.48 8.45 | | 27 |
| 28 | Same as above | H | OCH₃ | H | 2 | HCl | 182–188 | C F | 65.42 65.73 | 6.49 6.63 | 3.47 3.30 | 8.78 8.97 | | 28 |

\* C=Calculated; F=Found.

EXAMPLE 29

(a) To a solution of 4 g. of 2-(3-chloropropoxy)-benzaldehyde and 4 g. of 4-bromoacetophenone in 25 ml. of ethanol was added dropwise with agitation a solution of 1 g. of sodium hydroxide in 2.5 ml. of water under ice-cooling. The mixture was further agitated for 3 hours under ice-cooling. The precipitated crystals were separated by filtration, washed with water and then recrystallized from ethanol to give 7.4 g. of 2-(3-chloropropoxy)-4'-bromochalcone having a melting point of 75–77° C.

Elementary analysis for $C_{18}H_{16}O_2ClBr$.—Calculated: C, 56.94%; H, 4.25%; Cl, 9.34%; Br 21.05%. Found: C, 56.55%; H, 4.05%; Cl, 9.27%; Br, 20.89%.

The starting 2-(3-chloropropoxy)benzaldehyde was prepared as follows:

To 300 ml. of ethanol was dissolved 4.6 g. of sodium and then were added with agitation 24.4 g. of salicylaldehyde, 0.1 g. of sodium iodide and 64 g. of 3-chloropropyl bromide. The mixture was refluxed for 8 hours and filtered off to remove the dissolved substance. The filtrate was concentrated to give an oily substance. The resulting oily substance was distilled in vacuo to give 31 g. of the desired product having a boiling point of 148° C. at 4 mm. Hg.

(b) 3.0 g. of 2-(3-chloropropoxy)-4'-bromochalcone obtained above and 2 g. of N-methylpiperazine were dissolved in 30 ml. of anhydrous toluene. The mixture was refluxed for 7 hours. To the reaction mixture was added water and then the mixture was made alkaline with sodium hydroxide. Toluene layer was separated from the mixture and extracted with dilute hydrochloric acid. The extract was made alkaline with sodium hydroxide and extracted with ether. The ether extract was washed with water and dried over anhydrous sodium sulfate and ethereal hydrochloric acid was added to the ether extract. The resulting precipitate was separated by filtration and recrystallized from ethanol to give 2.1 g. of 2-[3-(N'-methylpiperazino)propoxy]-4'-bromochalcone dihydrochloride (Compound No. 29) having a melting point of 209–213° C. as faint yellow scales.

Elementary analysis for $C_{23}H_{27}N_2O_2Br \cdot 2HCl \cdot \tfrac{1}{2}H_2O$.—Calculated: C, 52.59%; H, 5.56%, N, 5.33%; Cl, 13.50%; Br, 15.21%. Found: C, 52.63%; H, 5.48%; N, 5.42%; Cl, 13.44%; Br 15.16%.

EXAMPLE 30

(a) To a solution of 4 g. of 2-(3-chloropropoxy)-benzaldehyde and 3.1 g. of 4-chloroacetophenone in 25 ml. of ethanol was added dropwise with agitation a solution of 1 g. of sodium hydroxide in 2.5 ml. of water under ice-cooling. The mixture was further agitated for 3 hours under ice-cooling. The precipitated crystals were separated by filtration, washed with water and then recrystallized from ethanol to give 6.4 g. of 2-(3-chloropropoxy)-4'-chlorochalcone having a melting point of 78–79° C.

Elementary analysis for $C_{18}H_{16}O_2Cl_2$.—Calculated: C, 64.49%; H, 4.81%; Cl, 21.15%. Found: C, 64.33%; H, 4.92%; Cl, 20.87%.

Alternatively, the 2-(3-chloropropoxy)-4'-chlorochalcone was prepared by the following methods.

(1) To a solution of 300 mg. of sodium dissolved into 5 ml. of ethanol was added dropwise with agitation a solution of 1.99 g. of 2-(3-chloropropoxy)benzaldehyde and 1.55 g. of 4-chloroacetophenone in 10 ml. of ethanol under ice-cooling. The mixture, in which crystals were precipitated after a few minutes, was reacted with agitation for 3 hours under ice-cooling. To the reaction mixture was added water and the crystals were separated by filtration and dried to give 3.3 g. of the desired compound.

(2) To a solution of 1.99 g. of 2-(3-chloropropoxy)-benzaldehyde and 1.55 g. of 4-chloroacetophenone in 20 ml. of ethanol was added with agitation 1 ml. of concentrated sulfuric acid. The mixture was added onto ice water and extracted with benzene. The benzene layer was washed with water, dried and evaporated to remove benzene. To the oily residue was added n-hexane and the resulting crystals were filtered to give 2.6 g. of the desired compound.

(3) To a solution of 1.99 g. of 2-(3-chloropropoxy)-benzaldehyde and 1.55 g. of 4-chloroacetophenone in 50 ml. of ethyl acetate was saturated dried hydrogen chloride gas. The flask including the mixture was stopped and allowed to stand for 4 days. The reaction mixture was evaporated at about 50° C. under reduced pressure to remove ethyl acetate. The oily residue was heated on boiling water-bath under reduced pressure for 1 hour. The resulting crystals were washed with n-hexane and filtered to give 1.7 g. of the desired compound.

(b) 5 g. of 2-(3-chloropropoxy)-4'-chlorochalcone and 5.25 g. of N-benzylpiperazine were dissolved into 30 ml. of toluene. The mixture was refluxed for 8 hours. The precipitating N-benzylpiperazine was filtered off and the filtrate was washed with water, dried over anhydrous sodium sulfate and distilled under reduced pressure to remove toluene. To the oily residue was added alcoholish hydrochloric acid. The resulting crystals were recrystallized from methanol to give 7.1 g. of 2-[3-(N'-benzylpiperazino)-propoxy]-4'-chlorochalcone dihydrochloride (Compound No. 30) having a melting point of 225–228° C. (decomposition).

Elementary analysis for $C_{29}H_{31}N_2O_2Cl \cdot 2HCl$.—Calculated: C, 63.56%; H, 6.07%; N, 5.11%; Cl, 19.41. Found: C, 63.33%; H, 6.02%; N, 5.31%; Cl, 18.91%.

EXAMPLE 31

A solution of 5 g. of 2-(3-chloropropoxy)-4'-chlorochalcone prepared in the same manner as described in Example 30(a) and 5.75 g. of N-(2-methoxyphenyl) piperazine in 30 ml. of toluene was refluxed for 8 hours. The reaction mixture was treated in the same manner as described in Example 30(b) and the resulting crystals were recrystallized from methanol to give 7.4 g. of 2-{3-[N'-(2-methoxyphenyl)piperazino]propoxy}-4'-chlorochalcone dihydrochloride (Compound No. 31) having a melting point 215–218° C.

Elementary analysis for $C_{29}H_{31}N_2O_3Cl \cdot 2HCl \cdot \frac{1}{3}H_2O$ —Calculated: C, 61.11%; H, 5.95%; N, 4.92%; Cl, 18.66%. Found: C, 61.25%; H, 5.73%; N, 5.00%; Cl, 18.79%.

EXAMPLE 32

(a) To a solution of 5 g. of 2-(3-chloropropoxy)-benzaldehyde and 3.35 g. of 4-methylacetophenone in 30 ml. of ethanol was added dropwise with agitation a solution of 1.25 g. of sodium hydroxide in 3 ml. of water under ice-cooling. After the mixture was further agitated for 3 hours under ice-cooling, a large volume of water was added to the mixture. The mixture was extracted with benzene. The benzene layer was separated, washed with water, dried over anhydrous sodium sulfate and distilled to remove benzene to give 8 g. of oily 2-(3-chloropropoxy)-4'-methylchalcone.

(b) 5.0 g. of 2-(3-chloropropoxy)-4'-methylchalcone obtained above and 4.75 g. of N-methylpiperazine were dissolved into 30 ml. of toluene. The mixture was refluxed for 8 hours and then water was added to the reaction mixture. The toluene layer was separated and extracted with diluted hydrochloric acid. The extract was made alkaline with sodium hydroxide and the resulting milky precipitate was extracted with benzene. The benzene layer was washed with water, dried over anhydrous sodium hydroxide and distilled to remove benzene. To thus obtained oily residue was added alcoholish hydrochloric acid. The resulting crystals were recrystallized from ethanol to give 4 g. of 2-[3-N'-methylpiperazino)-propoxy]-4'-methylchalcone dihydrochloride (Compound No. 32) having a melting point of 210–215° C.

Elementary analysis for $C_{24}H_{30}N_2O_2 \cdot 2HCl \cdot \frac{2}{3}H_2O$.—Calculated: C, 62.20%; H, 7.25%; N, 6.05%; Cl, 15.30%. Found: C, 62.43%; H, 7.38%; N, 6.05%; Cl, 15.56%.

EXAMPLE 33

To a solution of 40.2 g. of 2-(3-chloropropoxy)-4'-chlorochalcone in 120 ml. of toluene was added 26.5 g. of N-methylpiperazine. The mixture was refluxed on oil-bath for 4 hours and filtered off to remove the precipitate. The toluene solution was washed with water and distilled to remove toluene. The resulting residue was dissolved in 500 ml. of ethanol and to the solution was added hydrogen chloride gas under cooling. The mixture was allowed to stand overnight. The resulting precipitate was separated by filtration and recrystallized from 800 ml. of ethanol to give 370 g. of 2-[3-(N'-methylpiperazino)propoxy] - 4' - chlorochalcone dihydrochloride (Compound No. 6) having a melting point of 225–227° C.

Elementary analysis for $C_{23}H_{27}N_2O_2Cl \cdot 2HCl \cdot \frac{1}{3}H_2O$. —Calculated: C, 57.81%; H, 6.26%; N, 5.86%; Cl, 22.26%. Found: C, 58.00%; H, 6.32%; N, 5.81%; Cl, 21.96%.

In the above method (b), by using isobutylamine and piperazine instead of N-methylpiperazine there were prepared the following compounds, respectively.

2-(3-isobutylaminopropoxy)-4'-chlorochalcone oxalate (Compound No. 33) having a melting point of 172–175° C.

2-(3-piperazinopropoxy) - 4'-chlorochalcone dihydrochloride (Compound No. 34) having a melting point of 173–176° C. (dec.).

EXAMPLE 34

(a) To a solution of 2 g. of 2-(3-tosyloxypropoxy)-benzaldehyde and 0.93 g. of 4-chloroacetophenone dissolved into a mixture of 10 ml. of ethanol and 20 ml. of dioxane was added dropwise with agitation a solution of 0.3 g. of sodium hydroxide in 1 ml. of water under ice-cooling. The mixture was further agitated for 3 hours under ice-cooling and allowed to stand overnight in a refrigerator. To the reaction mixture was added a large volume of water. The mixture was made acidic with hydrochloric acid and extracted with benzene. The benzene layer was washed with water, dried over anhydrous sodium sulfate and distilled under reduced pressure to remove benzene. The resulting oily residue was washed with ether, filtered and recrystallized from benzene-n-hexane to give 1.1 g. of 2-(3-tosyloxypropoxy)-4'-chlorochalcone having a melting point of 114–117° C.

(b) 842 mg. of 2-(3-tosyloxypropoxy)-4'-chlorochalcone obtained above and 800 mg. of N-methylpiperazine were dissolved into 15 ml. of benzene. The mixture was refluxed for 2 hours and then water was added to the reaction mixture. The benzene layer was separated, dried over anhydrous sodium hydroxide and distilled to remove benzene. The oily residue was dissolved into ethanol and ethereal hydrochloric acid was added to the solution. The precipitated crystals were separated by filtration and recrystallized from ethanol to give 700 mg. of 2-[3-(N'-methylpiperazino)propoxy] - 4'-chlorochalcone dihydrochloride (Compound No. 6).

EXAMPLE 35

(a) To a solution of 9.2 g. of 2-(2-chloroethoxy)benzaldehyde and 6.0 g. of acetophenone in 50 ml. of ethanol was added dropwise with agitation a solution of 2 g. of sodium hydroxide in 20 ml. of water under ice-cooling. The mixture was allowed to stand overnight and 200 ml. of water was added to the mixture. The mixture was repeatedly extracted several times with total 300 ml. of chloroform. The chloroform layer was washed with dilute hydrochloric acid, water, aqueous sodium hydrogen carbonate solution and water in order, dried over anhydrous sodium sulfate and distilled to remove chloroform to give 12.2 g. of oily 2-(2-chloroethoxy)chalcone.

(b) Thus obtained 2-(2-chloroethoxy)chalcone was dissolved in 130 ml. of toluene and to the solution was added 17.5 g. of N-methylpiperazine. The mixture was refluxed for 5 hours. The reaction mixture was washed with water and extracted with dilute hydrochloric acid. To the extract was gradually added dropwise a dilute aqueous sodium hydroxide solution. The resulting milky precipitate was extracted with chloroform. The chloroform layer was washed with water, dried over anhydrous sodium sulfate and distilled to remove chloroform. The residue was dissolved in ethanol and ethanolic hydrochloric acid was added to the solution. The mixture was concentrated to give crude crystals. The crystals were recrystallized from methanol to give 13.1 g. of 2-(2-

N' - methylpiperazino)ethoxy chalcone dihydrochloride (Compound No. 35) having a melting point of 212–216° C. (dec.).

Elementary analysis for $C_{22}H_{26}N_2O_2 \cdot 2HCl \cdot H_2O$.—
Calculated: C, 59.81%; H, 6.85%; N, 6.34%; Cl, 16.02%.
Found: C, 60.00%; H, 6.94%; N, 6.18%; Cl, 15.64%.

EXAMPLES 36–63

In the same manner as described in Examples 29–35, there were prepared various chalcone derivatives of the following formula:

$$R_1,R_2\text{-C}_6H_3\text{-CH=CH-CO-C}_6H_3\text{-}R_4,R_5\text{-}R_3\cdot Salt$$
with $-O(CH_2)_n-N(R',R'')$ These various chalcone derivatives are listed in Table II.

TABLE II

| Example Number | Groups $-O(CH_2)_n-N(R',R'')$ | $R_1$ | $R_2$ | $R_3$ | $R_4$ | $R_5$ | Salt | Melting point (°C.) | | Elementary analysis | | | | | Comp. No. |
|---|---|---|---|---|---|---|---|---|---|---|---|---|---|---|---|
| | | | | | | | | | | C | H | N | Cl | Br | |
| 36 | 2-O(CH$_2$)$_2$-N(piperazine)N-CH$_3$ | H | H | OH | H | H | 2HCl | 214-218 (dec.) | C F | 60.92 60.99 | 6.67 6.76 | 6.18 6.05 | 15.64 15.30 | | 36 |
| 37 | Same as above | H | Cl | Cl | H | H | 2HCl | >240 | C F | 54.56 54.69 | 5.57 5.40 | 5.53 5.53 | 28.01 27.79 | | 37 |
| 38 | 2-O(CH$_2$)$_2$-N(piperazine)N-(4-Cl-C$_6$H$_4$) | H | H | Cl | H | H | HCl | 160-163 (dec.) | C F | 63.22 63.40 | 5.50 5.52 | 5.27 5.22 | 20.00 20.22 | | 38 |
| 39 | 2-O(CH$_2$)$_2$-N(piperazine)N-CH$_3$ | H | Cl | H | H | H | HCl·1/2H$_2$O | 208-210 | C F | 57.43 56.84 | 6.29 6.38 | 5.82 5.98 | 22.12 22.74 | | 39 |
| 40 | Same as above | H | OCH$_3$ | OCH$_3$ | OCH$_3$ | H | 2HCl | 170-175 | C F | 59.20 58.90 | 6.88 7.18 | 5.31 5.15 | 13.44 12.74 | | 40 |
| 41 | do | H | H | H | OCH$_3$ | H | 2HCl·H$_2$O | 217-223 | C F | 60.66 60.85 | 7.08 6.95 | 6.15 6.23 | 15.57 15.99 | | 41 |
| 42 | 4-O(CH$_2$)$_2$-N(piperazine)N-CH$_3$ | H | H | Cl | H | H | | 90-93 | C F | 69.25 69.28 | 6.82 6.97 | 7.02 7.11 | 8.89 9.00 | | 42 |
| 43 | 2-O(CH$_2$)$_2$-N(piperazine)N-C$_2$H$_5$ | H | OCH$_3$ | OCH$_3$ | H | H | COOH-COOH | 119-121 | C F | 62.66 62.42 | 6.82 7.06 | 2.71 2.59 | | | 21 |
| 44 | 2-O(CH$_2$)$_2$-N(piperidine) | H | H | Cl | H | H | HCl | 208-209 208-209 | C F | 65.71 65.51 | 6.47 6.53 | 3.33 3.18 | 16.87 16.91 | | 25 |

See footnote at end of table.

TABLE II

| Example Number | Groups -O(CH₂)ₐ-N<R'/R'' | | R₁ | R₂ | R₃ | R₄ | R₅ | Salt | Melting point (°C.) | Elementary analysis | | | | | Comp. No. |
|---|---|---|---|---|---|---|---|---|---|---|---|---|---|---|---|
| | | | | | | | | | | | C | H | N | Cl | Br | |
| 45 | 2-O(CH₂)₂-N | N-CH₃ (piperazine) | H | H | OCH₃ | H | H | 2HCl·1/2H₂O | 210-211 | C | 60.50 | 6.98 | 5.88 | 14.88 | --- | 5 |
| | | | | | | | | | | F | 60.60 | 7.33 | 5.74 | 15.01 | --- | |
| 46 | 2-O(CH₂)₂-N | O (morpholine) | H | H | OCH₃ | H | H | HCl | 165-168 | C | 66.10 | 6.70 | 3.35 | 8.48 | --- | 27 |
| | | | | | | | | | | F | 65.96 | 6.90 | 3.09 | 8.45 | --- | |
| 47 | 2-O(CH₂)₂-N | N-CHO (piperazine) | H | H | Cl | H | H | HCl·1/4H₂O | 195-207 | C | 60.86 | 5.88 | 6.17 | 15.62 | --- | 44 |
| | | | | | | | | | | F | 60.74 | 5.84 | 5.81 | 16.38 | --- | |
| 48 | 2-O(CH₂)₂-N | N-CH₂CH₂OH (piperazine) | H | H | OCH₃ | H | H | 2HCl | 223-225 | C | 60.48 | 6.70 | 5.64 | 14.28 | --- | 4 |
| | | | | | | | | | | F | 60.33 | 7.07 | 5.49 | 14.35 | --- | |
| 49 | 2-O(CH₂)₂-N | N-(4-Cl-C₆H₄) (piperazine) | H | H | Cl | H | H | 2HCl·1/2EtOH | 195-201 | C | 58.25 | 5.40 | 4.85 | 24.56 | --- | 45 |
| | | | | | | | | | | F | 58.44 | 4.93 | 5.21 | 23.86 | --- | |
| 50 | 2-O(CH₂)₂-N | N-(3-OCH₃-C₆H₄) (piperazine) | H | H | Cl | H | H | 2HCl·1/2H₂O | 194-200 | C | 60.17 | 5.77 | 5.01 | 19.03 | --- | 46 |
| | | | | | | | | | | F | 60.18 | 5.75 | 4.87 | 18.88 | --- | |
| 51 | 4-O(CH₂)₂-N | N-CH₃ (piperazine) | H | H | OCH₃ | H | H | 2HCl | 227-235 | C | 60.93 | 6.67 | 6.18 | 15.64 | --- | 47 |
| | | | | | | | | | | F | 60.37 | 6.67 | 6.21 | 15.88 | --- | |
| 52 | 3-O(CH₂)₂-N | N-CH₃ (piperazine) | H | H | OCH₃ | H | H | 2HCl | 200-205 (dec.) | C | 60.93 | 6.67 | 6.18 | 15.64 | --- | 48 |
| | | | | | | | | | | F | 60.50 | 6.70 | 6.20 | 15.44 | --- | |
| 53 | 2-O(CH₂)₂-N | N-(4-Cl-C₆H₄) (piperazine?) | H | H | H | H | H | HCl | 186-189 | C | 67.08 | 5.84 | 5.79 | 14.67 | --- | 49 |
| | | | | | | | | | | F | 66.93 | 5.96 | 5.58 | 14.60 | --- | |
| 54 | 3-O(CH₂)₂-N | CH₃/CH₃ | H | H | Br | H | H | HCl | 197-200 | C | 55.56 | 5.15 | 3.41 | 8.63 | 19.48 | 50 |
| | | | | | | | | | | F | 55.45 | 5.04 | 3.19 | 8.76 | 19.74 | |
| 55 | 2-O(CH₂)₂-N | C₂H₅/C₂H₅ | H | H | OCH₃ | H | H | HCl | 183-185 | C | 67.77 | 7.24 | 3.59 | 9.09 | --- | 16 |
| | | | | | | | | | | F | 67.63 | 7.40 | 3.65 | 9.07 | --- | |
| 56 | 2-O(CH₂)₂-N | (piperidine) | H | H | OCH₃ | H | H | HCl | 152-154 | C | 68.73 | 7.02 | 3.49 | 8.82 | --- | 22 |
| | | | | | | | | | | F | 68.52 | 7.03 | 3.32 | 8.76 | --- | |
| 57 | Same as above | | H | OCH₃ | OCH₃ | OCH₃ | H | HCl | 186-187 | C | 65.00 | 6.98 | 3.03 | 7.67 | --- | 24 |
| | | | | | | | | | | F | 64.87 | 7.25 | 2.87 | 7.56 | --- | |

| | 11 | 10 | 51 | 52 | 53 | 54 |
|---|---|---|---|---|---|---|
| 58 | 17.36 / 17.43 | 3.43 / 3.31 | 5.68 / 5.51 | 61.77 / 61.53 | 151–155 | HCl |
| 59 | 14.76 / 14.83 | 5.78 / 6.18 | 6.92 / 6.97 | 57.50 / 57.25 | 115–118 | 2HCl·3/2H₂O |
| 60 | 9.80 / 10.09 | 3.87 / 3.86 | 6.68 / 6.95 | 66.38 / 66.09 | 175–179 | HCl |
| 61 | 10.19 / 10.54 | 4.03 / 3.99 | 6.37 / 6.46 | 65.61 / 65.34 | 180–182 | HCl |
| 62 | 10.19 / 10.12 | 4.03 / 4.00 | 6.37 / 6.39 | 65.61 / 65.75 | 153 | HCl |
| 63 | 9.48 / 9.50 | 3.75 / 3.74 | 7.55 / 7.47 | 70.67 / 70.85 | 100 | HCl |

*C = Calculated. F = Found.

EXAMPLE 64

To a solution of 0.46 g. of sodium in 30 ml. of ethanol was added 3.4 g. of 3-(3′,4′,5′-trimethoxybenzoyl)coumarin. The mixture was heated to dissolve and then distilled to remove ethanol. To the resulting residue was added toluene and then the remaining ethanol was separated as the toluene azeotrope. To the toluene solution was added 1.8 g. of 3-dimethylaminopropyl chloride. The mixture was refluxed for 7 hours. After cooling, the reaction mixture was filtered and the filtrate was extracted several times with dilute hydrochloric acid. The dilute hydrochloric acid layer was saturated with sodium chloride and then extracted with chloroform. The chloroform layer was dried over anhydrous sodium sulfate and distilled to remove chloroform. The resulting residue was recrystallized from isopropanol to give 1.55 g. of 2-(3-dimethylaminopropoxy) - 3′,4′,5′ - trimethoxychalcone hydrochloride (Compound No. 8) having a melting point of 170–173° C.

The starting 3 - (3′,4′,5′-trimethoxybenzoyl)coumarin was prepared as follows:

To a solution of 17.8 g. of ethyl 3,4,5-trimethoxybenzoyl-acetate and 7.7 g. of salicylaldehyde in 100 ml. of ethanol was added 10 drops of piperidine. The mixture was refluxed for 20 minutes (after about 5 minutes crystals appeared) and then cooled. The precipitated crystals were separated by filtration and recrystallized from chloroform-ethanol to give 14.0 g. of the desired compound having a melting point of 195–197° C.

Elementary analysis for $C_{19}H_{16}O_6$.—Calculated: C, 67.05%; H, 4.74%. Found: C, 66.98%; H, 5.01%.

EXAMPLE 65

To a solution of 0.46 g. of sodium in 30 ml. of ethanol was added 3.4 g. of 3-(3′,4′,5′-trimethoxybenzoyl)coumarin. The mixture was heated till the coumarin was dissolved into the solution and then distilled to remove ethanol. To the residue was added toluene. The mixture was treated in the same manner as described in Example 64. To the obtained toluene layer was added 2 g. of 2-dimethylaminoethyl chloride and the mixture was treated in the same manner as described in Example 64 to give 1.1 g. of 2-(2-dimethylaminoethoxy)-3′,4′,5′-trimethoxychalcone hydrochloride (Compound No. 9) having a melt-point of 165–168° C.

EXAMPLE 66

To a solution of 0.4 g. of sodium in 50 ml. of ethanol was added 2.8 g. of 3-(4′-chlorobenzoyl)coumarin. The mixture was refluxed for 1 hour and then distilled under reduced pressure to remove ethanol. To the residue was added 30 ml. of toluene and then 3 g. of 3-diethylaminopropyl chloride was added to the toluene solution. The mixture was refluxed for 8 hours. After cooling, the toluene layer was washed with water and extracted with dilute hydrochloric acid. The dilute hydrochloric acid layer was washed with ether and extracted with chloroform. The chloroform layer was separated and distilled to remove chloroform. The resulting residue was recrystallized from ethanol to give 1.2 g. of 2-(3-diethylaminopropoxy) - 4′ - chlorochalcone hydrochloride (Compound No. 19) having a melting point of 164–165° C.

Elementary analysis for $C_{22}H_{26}NO_2Cl \cdot HCl$.—Calculated: C, 64.82%; H, 6.68%; N, 3.44%; Cl, 17.22%. Found: C, 64.45%; H, 6.71%; N, 3.24%; Cl, 17.21%.

The starting 3-(4′-chlorobenzoyl)coumarin was prepared as follows:

To a solution of 41 g. of ethyl 4-chlorobenzoylacetate and 21 g. of salicylaldehyde in 210 ml. of ethanol was added 20 drops of piperidine. The mixture was refluxed for 20 minutes. After cooling, the precipitated crystals were separated by filtration and recrystallized from dimethylformaldehyde-water to give 34.2 g. of the desired compound having a melting point of 206° C.

Elementary analysis for $C_{16}H_9O_3Cl$.—Calculated: C, 67.50%; H, 3.19%; Cl, 12.45%. Found: C, 67.34%; H, 3.27%; Cl, 12.54%.

EXAMPLE 67

To a solution of 0.4 g. of sodium in 50 ml. of ethanol was added 2.8 g. of 3-(4'-chlorobenzoyl)coumarin. The mixture was treated in the same manner as described in Example 66. To the obtained toluene solution was added 2.5 g. of 2-dimethylaminoethyl chloride and the mixture was treated in the same manner as described in Example 66 to give 1.3 g. of 2-(2-dimethylaminoethoxy)-4'-chlorochalcone hydrochloride (Compound No. 12) having a melting point of 152–154° C.

EXAMPLES 68–95

In the same manner as described in Examples 66 and 67, there were prepared various kinds of chalcone derivatives of the following formula:

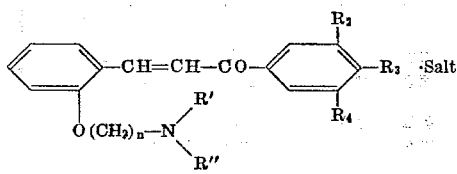

These chalcone derivatives are listed in Table III.

TABLE III

| Ex. No. | Groups -N(R'/R'') | R₂ | R₃ | R₄ | n | Salt | Melting point (°C.) | | C | H | N | Cl | Br | Comp. No. |
|---|---|---|---|---|---|---|---|---|---|---|---|---|---|---|
| 68 | -N◯ (piperidino) | H | OCH₃ | H | 3 | HCl·H₂O | 98–100 | C* F | 67.98 67.58 | 7.37 7.89 | 3.23 2.98 | 8.36 7.64 | | 3 |
| 69 | -N◯N—CH₂CH₂OH | H | OCH₃ | H | 3 | 2HCl | 223–225 | C F | 60.48 60.34 | 6.70 7.01 | 5.64 5.51 | 14.28 14.34 | | 4 |
| 70 | -N◯N—CH₃ | H | OCH₃ | H | 3 | 2HCl·1/2H₂O | 210–211 | C F | 60.50 60.55 | 6.98 7.57 | 5.88 5.78 | 14.88 15.00 | | 5 |
| 71 | Same as above | H | OCH₃ | H | 2 | 2HCl·3/2H₂O | 115–118 | C F | 57.50 57.34 | 6.92 6.98 | 5.78 6.17 | 14.76 14.83 | | 10 |
| 72 | -N(CH₃)(CH₃) | H | OCH₃ | H | 2 | HCl | 178–180 | C F | 66.38 66.52 | 6.68 6.77 | 3.87 3.78 | 9.80 9.65 | | 14 |
| 73 | -N(C₂H₅)(C₂H₅) | H | OCH₃ | H | 2 | HCl | 183–185 | C F | 67.77 67.66 | 7.24 7.43 | 3.59 3.56 | 9.09 9.08 | | 16 |
| 74 | Same as above | H | OCH₃ | H | 3 | HCl | 154–155 | C F | 68.37 68.25 | 7.49 7.63 | 3.47 3.36 | 8.78 8.91 | | 17 |
| 75 | -N◯ | H | OCH₃ | H | 2 | HCl·3/2H₂O | 152–154 | C F | 64.39 64.13 | 7.28 7.76 | 3.27 3.14 | 8.27 7.91 | | 22 |
| 76 | -N◯O | H | OCH₃ | H | 3 | HCl | 161–162 | C F | 66.10 65.98 | 6.75 6.89 | 3.35 3.23 | 8.48 8.47 | | 27 |
| 77 | Same as above | H | OCH₃ | H | 2 | HCl | 182–188 | C F | 65.43 65.64 | 6.49 6.52 | 3.47 3.39 | 8.78 8.79 | | 28 |
| 78 | -N(CH₃)(CH₃) | H | Cl | H | 3 | HCl | 155–157 | C F | 63.16 63.01 | 6.10 6.17 | 3.63 3.45 | 18.65 18.71 | | 13 |
| 79 | -N(C₂H₅)(C₂H₅) | H | Cl | H | 2 | HCl | 145–146 | C F | 64.08 63.99 | 6.40 6.50 | 3.56 3.39 | 17.83 18.01 | | 18 |
| 80 | -N◯ | H | Cl | H | 2 | HCl | 182–183 | C F | 64.96 64.98 | 6.20 6.53 | 3.44 3.43 | 17.47 17.51 | | 23 |
| 81 | -N◯N—CH₂—◯—OCH₃ | H | Cl | H | 3 | 2HCl | 220–223 | C F | 62.45 62.44 | 5.94 5.99 | 4.86 4.75 | 18.44 18.46 | | 7 |
| 82 | -N◯N—CH₃ | H | Cl | H | 3 | 2HCl | 225–227 | C F | 58.80 58.87 | 6.22 6.43 | 5.96 6.06 | 22.64 22.29 | | 6 |
| 83 | -N◯ | H | Cl | H | 3 | HCl | 208–209 | C F | 65.71 65.54 | 6.47 6.51 | 3.33 3.23 | 16.87 16.90 | | 25 |
| 84 | -N◯N—◯ | H | OCH₃ | H | 2 | HCl | 192–195 | C F | 70.06 70.11 | 6.51 6.61 | 5.84 6.00 | 7.40 7.69 | | 2 |
| 85 | -N◯ | OCH₃ | OCH₃ | OCH₃ | 3 | HCl·1/2H₂O | 183–184 | C F | 64.39 64.32 | 7.27 7.43 | 2.89 2.78 | 7.31 7.36 | | 26 |
| 6 | -N◯O | H | OCH₃ | H | 3 | HCl | 165–168 | C F | 66.10 66.01 | 6.70 6.89 | 3.35 3.12 | 8.48 8.46 | | 27 |

See footnotes at end of table.

TABLE III—Continued

| Ex. No. | Groups −N(R'/R") | $R_2$ | $R_3$ | $R_4$ | n | Salt | Melting point (°C.) | | C | H | N | Cl | Br | Comp. No. |
|---|---|---|---|---|---|---|---|---|---|---|---|---|---|---|
| 87 | −N⟨  ⟩N−CH₃ | H | Cl | H | 2 | 2HCl | 216-223 | C | 57.72 | 5.94 | 6.12 | 23.23 | | |
| | | | | | | | | F | 57.48 | 6.01 | 6.43 | 23.12 | | |
| 88 | −N(CH₃/CH₃) | H | Br | H | 2 | HCl | 172-177 | C | 55.56 | 5.15 | 3.41 | 8.63 | 19.48 | 55 |
| | | | | | | | | F | 55.72 | 5.24 | 3.28 | 8.73 | 19.66 | |
| 89 | Same as above | H | Br | H | 3 | HCl | 138-140 | C | 56.55 | 5.46 | 3.30 | 8.35 | 18.81 | 56 |
| | | | | | | | | F | 56.69 | 5.53 | 3.25 | 8.22 | 18.53 | |
| 90 | −N(CH₂CH=CH₂/CH₂CH=CH₂) | H | Cl | H | 3 | HCl | 153-155 | C | 66.67 | 6.29 | 3.24 | 16.40 | | 57 |
| | | | | | | | | F | 66.72 | 6.06 | 3.27 | 16.66 | | |
| 91 | −N⟨  ⟩N−CH₃ | H | Br | H | 2 | 2HCl | 220-223 | C | 52.61 | 5.42 | 5.58 | 14.12 | 15.90 | 58 |
| | | | | | | | | F | 52.38 | 5.55 | 5.51 | 14.26 | 16.19 | |
| 92 | −N⟨  ⟩ | H | Br | H | 2 | HCl | 220-223 | C | 58.62 | 5.59 | 3.11 | 7.86 | 17.73 | 59 |
| | | | | | | | | F | 58.33 | 5.90 | 2.82 | 7.84 | 17.68 | |
| 93 | −N(C₂H₅/C₂H₅) | H | CH₃ | H | 2 | HCl | 100 | C | 70.67 | 7.55 | 3.75 | 9.48 | | 54 |
| | | | | | | | | F | 70.81 | 7.43 | 3.76 | 9.52 | | |
| 94 | Same as above | H | H | H | 2 | HCl | 146-147 | C | 70.02 | 7.00 | 3.89 | 9.85 | | 60 |
| | | | | | | | | F | 69.77 | 7.20 | 4.12 | 9.87 | | |
| 95 | −N⟨  ⟩ | OCH₃ | OCH₃ | OCH₃ | 2 | HCl | 186-187 | C | 65.00 | 6.98 | 3.03 | 7.67 | | 24 |
| | | | | | | | | F | 64.92 | 7.13 | 2.97 | 7.55 | | |

*C=Calculated; F=Found.

EXAMPLE 96

To a solution of 1.5 g. of 2-hydroxy-3',4'-dichlorochalcone in 20 ml. of toluene was added 0.3 g. of sodium hydride (50% by weight). The mixture was refluxed for 1 hour. To the solution was added a solution of 1.4 g. of 2-diethylaminoethyl chloride in 30 ml. of toluene. The mixture was refluxed for 4 hours, allowed to stand overnight and filtered. The filtrate was washed with water and extracted with dilute hydrochloric acid. The dilute hydrochloric acid layer was concentrated under reduced pressure. The precipitated crystals were recrystallized from ethanol to give 1.2 g. of 2 - (2 - diethylaminoethoxy)-3',4'-dichlorochalcone hydrochloride (Compound No. 61) having a melting point of 164° C.

Elementary analysis for $C_{21}H_{23}NO_2Cl_2 \cdot HCl$.—Calculated: C, 58.82%; H, 5.64%; N, 3.27%; Cl, 24.80%. Found: C, 58.77%; H, 5.67%; N, 3.18%; Cl, 24.72%.

EXAMPLE 97

To a solution of 2.4 g. of 2 - hydroxy - 4' - methylchalcone in 50 ml. of toluene was added 0.6 g. of sodium hydride (50% by weight). The mixture was heated for 1 hour. To the solution was added a solution of 3 g. of 2-diethylaminoethyl chloride in 30 ml. of toluene. The mixture was refluxed for 4 hours. After cooling, the precipitate was filtered off. The resulting toluene solution was washed with water and extracted with dilute hydrochloric acid. The dilute hydrochloric acid layer was washed with ether and extracted with chloroform. The chloroform layer was distilled. The resulting residue was recrystallized from isopropanol to give 2 g. of 2-(2-diethylaminoethoxy)- 4'-methylchalcone hydrochloride (Compound No. 54) having a melting point of 100° C.

Elementary analysis for $C_{22}H_{27}NO_2 \cdot HCl$.—Calculated: C, 70.67%; H, 7.55%; N, 3.75%; Cl, 9.48%. Found: C, 70.80%; H, 7.49%; N, 3.76%; Cl, 9.51%.

EXAMPLE 98

1.9 g. of 2 - (2 - dimethylaminoethoxy)benzaldehyde, 1.4 g. of 2-hydroxyacetophenone and 1 g. of potassium hydroxide were dissolved in 30 ml. of methanol. The mixture was refluxed for 4 hours and distilled to remove methanol. To the resulting residue was added water. The mixture was extracted with toluene. The toluene layer was extracted with dilute hydrochloric acid and then further the dilute hydrochloric acid layer was extracted with chloroform. The chloroform layer was distilled to remove chloroform. Thus obtained residue was recrystallized from isopropanol to give 1.8 g. of 2-(2-dimethylaminoethoxy)-2'-hydroxychalcone hydrochloride (Compound No. 53) having a melting point of 153° C.

Elementary analysis for $C_{19}H_{21}NO_3 \cdot HCl$.—Calculated: C, 65.61%; H, 6.37%; N, 4.03%; Cl, 10.19%. Found: C, 65.79%; H, 6.40%; N, 4.01%; Cl, 10.10%.

EXAMPLES 99–123

In the same manner as described in Examples 96–98, there were prepared various kinds of chalcone derivatives having the following formula:

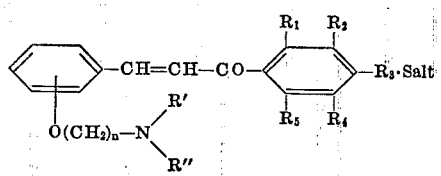

Thus obtained various chalcone derivatives are listed in Table IV.

TABLE IV

| Example number | Groups R'−O(CH₂)ₙ−N<R'/R'' | R₁ | R₂ | R₃ | R₄ | R₅ | Salt | Melting point (°C) | Elementary analysis C | H | N | Cl | Br | Comp. No. |
|---|---|---|---|---|---|---|---|---|---|---|---|---|---|---|
| 99 | 2-O(CH₂)₃−N(CH₃)(CH₃) | H | H | Cl | H | H | HCl | 152–154 | C 62.30 / F 61.99 | 5.78 / 6.01 | 3.82 / 3.62 | 19.36 / 19.32 | — | 12 |
| 100 | 2-O(CH₂)₃−N(CH₃)(CH₃) | H | H | Cl | H | H | HCl | 155–157 | 63.16 / 63.11 | 6.10 / 6.18 | 3.68 / 3.45 | 18.65 / 18.70 | — | 13 |
| 101 | 2-O(CH₂)₃−N(C₂H₅)(CH₃) | H | H | Cl | H | H | HCl | 164–165 | 64.82 / 64.48 | 6.68 / 6.71 | 3.44 / 3.41 | 17.22 / 17.23 | — | 19 |
| 102 | 2-O(CH₂)₃−N(C₂H₅)(CH₃) | H | H | Cl | H | H | HCl | 145–146 | 64.08 / 63.99 | 6.40 / 6.49 | 3.56 / 3.41 | 17.83 / 17.98 | — | 18 |
| 103 | 2-O(CH₂)₃−N(piperidinyl) | H | H | Cl | H | H | HCl | 182–183 | 64.96 / 64.95 | 6.20 / 6.37 | 3.44 / 3.43 | 17.47 / 17.51 | — | 23 |
| 104 | 2-O(CH₂)₃−N(N-methylpiperazinyl) | H | H | Cl | H | H | 2HCl | 220–223 | 62.45 / 62.52 | 5.94 / 6.12 | 4.86 / 4.65 | 18.44 / 18.38 | — | 7 |
| 105 | 2-O(CH₂)₃−N(N-methylpiperazinyl with p-OCH₃ phenyl) | H | H | Cl | H | H | 2HCl | 225–227 | 58.80 / 58.87 | 6.22 / 6.43 | 5.96 / 6.08 | 22.64 / 22.29 | — | 6 |
| 106 | 2-O(CH₂)₃−N(morpholinyl) | H | H | Cl | H | H | HCl | 208–209 | 65.71 / 65.54 | 6.47 / 6.51 | 3.33 / 3.20 | 16.87 / 16.89 | — | 25 |
| 107 | 2-O(CH₂)₃−N(N-methylpiperazinyl) | H | H | Cl | H | H | 2HCl | 151–155 | 61.77 / 61.54 | 5.68 / 5.47 | 3.43 / 3.29 | 17.36 / 17.43 | — | 11 |
| 108 | 2-O(CH₂)₃−N(CH₃)(CH₃) | H | H | Cl | H | H | HCl | 216–223 | 57.72 / 57.41 | 5.94 / 6.01 | 6.12 / 6.43 | 2.323 / 2.311 | — | 1 |
| 109 | 2-O(CH₂)₃−N(CH₃)(CH₃) | H | H | Br | H | H | HCl | 172–177 | 55.56 / 55.72 | 5.15 / 5.24 | 3.41 / 3.28 | 8.63 / 8.73 | 19.48 / 19.66 | 55 |
| 110 | 2-O(CH₂)₃−N(CH₃)(CH₃) | H | H | Br | H | H | HCl | 138–140 | 56.55 / 56.63 | 5.46 / 5.51 | 3.30 / 3.28 | 8.35 / 8.32 | 18.81 / 18.51 | 56 |

| | | | | | | | | | | |
|---|---|---|---|---|---|---|---|---|---|---|
| 111 | 4-O(CH₂)₂—N(C₂H₅)(C₂H₅) | H | H | H | H | HCl | 170–171 | C<br>F | 63.96<br>63.71 | 6.39<br>6.47 | 3.55<br>3.57 | 17.98<br>17.95 | 62 |
| 112 | 2-O(CH₂)₂—N(CH₂CH=CH₂)(CH₂CH=CH₂) | H | Cl | H | H | HCl | 153–155 | C<br>F | 66.67<br>66.70 | 6.29<br>6.12 | 3.24<br>3.29 | 16.40<br>16.54 | 57 |
| 113 | 4-O(CH₂)₂—N(C₂H₅)(C₂H₅) | H | Cl | H | H | HCl | 205–208 | C<br>F | 57.48<br>57.27 | 5.74<br>5.00 | 3.19<br>3.00 | 8.08<br>7.98 | 63 |
| 114 | 3-O(CH₂)₂—N(CH₃)(CH₃) | H | Br | H | H | HCl | 197–200 | C<br>F | 55.56<br>55.45 | 5.15<br>5.04 | 3.41<br>3.19 | 19.48<br>19.74 | 64 |
| 115 | 2-O(CH₂)₂—N〈piperazine〉N—CH₃ | H | Br | H | H | 2HCl | 220–223 | C<br>F | 52.61<br>52.45 | 5.42<br>5.51 | 5.58<br>5.58 | 15.90<br>16.12 | 58 |
| 116 | 2-O(CH₂)₂—N〈piperidine〉 | H | Br | H | H | HCl | 220–223 | C<br>F | 58.62<br>58.36 | 5.59<br>5.87 | 3.11<br>2.94 | 17.73<br>17.69 | 59 |
| 117 | 2-O(CH₂)₂—N(CH₃)(CH₃) | H | OH | H | H | HCl | 180–182 | C<br>F | 65.61<br>65.44 | 6.37<br>6.42 | 4.03<br>4.00 | 10.19<br>10.35 | 52 |
| 118 | 2-O(CH₂)₂—N(CH₃)(CH₃) | OH | OH | H | H | 3/2H₂O | 53–56 | C<br>F | 64.39<br>65.43 | 6.82<br>7.13 | 3.95<br>3.43 | | 65 |
| 119 | 2-O(CH₂)₂—N(CH₃)(CH₃) | CH₃ | H | CH₃ | H | COOH—COOH | 109–111 | C<br>F | 68.01<br>67.52 | 7.08<br>6.81 | 3.17<br>2.98 | | 66 |
| 120 | 2-O(CH₂)₂—N(C₂H₅)(C₂H₅) | H | Br | H | H | HCl | 205–208 | C<br>F | 59.43<br>59.47 | 5.85<br>5.94 | 3.01<br>3.08 | 17.19<br>17.18 | 67 |
| 121 | 3-O(CH₂)₂—N〈morpholine〉O | H | Br | H | H | HCl | 210–217 | C<br>F | 56.61<br>56.37 | 5.40<br>5.67 | 3.00<br>2.93 | 17.12<br>17.12 | 68 |
| 122 | 3-O(CH₂)₂—N(CH₃)(CH₃) | H | Br | H | H | HCl | 219–221 | C<br>F | 56.55<br>56.47 | 5.46<br>5.26 | 3.30<br>3.34 | 18.81<br>18.98 | 69 |
| 123 | 4-O(CH₂)₂—N(CH₃)(CH₃) | H | Cl | H | H | HCl | 160–163 | C<br>F | 63.22<br>63.38 | 5.50<br>5.53 | 5.27<br>5.23 | 20.00<br>20.19 | 38 |

*C = Calculated; F = Found.

EXAMPLE 124

The hypotensive activity of the present chalcone derivatives was tested in rats, weighing 270–300 g. The test compounds were administered orally to rats that were experimentally induced nephrogenous hypertension (the blood pressure: 170–200 mm. Hg). Then, the depressor response, peak time and duration were measured (Japanese Circulation Journal, vol. 27, p. 282, 1963). The results are shown in Table V.

TABLE V

| Test compound number[1] | Dose, mg./kg. | Depressor response (percent) | Peak time (hour) | Duration (hour) |
|---|---|---|---|---|
| 9 | 30 | −19.3 | 0.5 | 5–24 |
|   | 10 | −8.0 | 1 | 5 |
| 22 | 30 | −29.3 | 5 | 72 |
|    | 10 | −30.0 | 5 | 48 |
| 10 | 30 | −28.3 | 5 | 72 |
| 6 | 10 | −38.7 | 5 | 48 |
|   | 3 | −41.1 | 7 | 48 |
| 5 | 30 | −34.7 | 5 | 96 |
|   | 10 | −28.3 | 5 | 48 |
| 25 | 30 | −45.3 | 5 | 96 |
|    | 10 | −35.3 | 5 | 48 |
| 26 | 30 | −29.0 | 3 | 72 |
|    | 10 | −28.7 | 5 | 48 |
| 16 | 30 | −27.0 | 5 | 120 |
|    | 10 | −31.3 | 5 | 72 |

[1] See the following:

No. 5—2-[3-(N′-methylpiperazino)propoxy]-4′-methoxychalcone dihydrochloride.
No. 6—2-[3-(N′-methylpiperazino)propoxy]-4′-chlorochalcone dihydrochloride.
No. 9—2-(2-dimethylaminoethoxy)-3′,4′,5′-trimethoxychalcone hydrochloride.
No. 10—2-[2-(N′-methylpiperazino)ethoxy]-4′-methoxychalcone dihydrochloride.
No. 16—2-(2-diethylaminoethoxy)-4′-methoxychalcone hydrochloride.
No. 22—2-(2-piperidinoethoxy)-4′-methoxychalcone hydrochloride.
No. 25—2-(3-pipidinopropoxy)-4′-chlorochalcone hydrochloride.
No. 26—2-(3-piperidinopropoxy)-3′,4′,5′-trimethoxychalcone hydrochloride.

EXAMPLE 125

Acute toxicity ($LD_{50}$) of the present chalcone derivatives was tested in mice. The results are shown in Table VI.

TABLE VI

| Test compound number[3] | Administration route | |
|---|---|---|
|  | P.o.[1] | I.v.[2] |
| 16 | [4]1,208 | 21.9 |
| 20 | 805 | 28.3 |
| 26 |  | 24.7 |
| 6 | 2,860 | 51.2 |
| 25 |  | 22.9 |
| 5 | 1,486 | 37.7 |

[1] Per oral.
[2] Intravenous.
[3] See the following:
 Nos. 5, 6, 16, 25 and 26 the same as defined in Table V.
 No. 20—2-′(2-diethylaminoethoxy)-3′,4′,5′-trimethoxychalcone oxalate.
[4] Mg./kg.

What is claimed is:

1. A chalcone derivative of the following formula

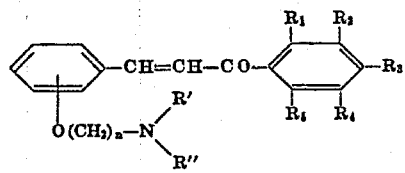

wherein $R_1$, $R_2$, $R_3$, $R_4$ and $R_5$ are the same or different, hydrogen atom, hydroxyl group, nitro group, an alkyl group having 1 to 3 carbon atoms, a halogen atom selected from chlorine, bromine and iodine or an alkoxy group having 1 to 3 carbon atoms; R′ R″ are bound together with nitrogen atom to form morpholino or piperazine group which is unsubstituted or substituted with one or more groups selected from an alkyl group having 1 to 3 carbon atoms, a hydroxyalkyl group having 1 to 3 carbon atoms phenyl group substituted or unsubstituted with a hydroxyl group, an alkoxy group having 1 to 3 carbon atoms or a halogen atom, benzyl group substituted or unsubstituted with hydroxyl group, an alkoxy group having 1 to 3 carbon atoms or halogen atom, or formyl group; $n$ is 2 or 3 and the group

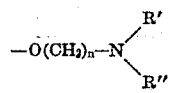

is substituted at ortho or meta position and the pharmaceutically acceptable acid addition salt.

2. The chalcone derivative according to claim 1, wherein the group

is a heterocyclic group selected from the group consisting of morpholino and piperazino group which is unsubstituted or substituted with one or more groups selected from an alkyl group having 1 to 3 carbon atoms, a hydroxyalkyl group having 1 to 3 carbon atoms, phenyl group substituted or unsubstituted with a hydroxyl group, an alkoxy group having 1 to 3 carbon atoms or a halogen atom, benzyl group substituted or unsubstituted with hydroxyl group, an alkoxy group having 1 to 3 carbon atoms or halogen atom, or formyl group.

3. The chalcone derivative of claim 1 wherein said pharmaceutically acceptable acid addition salt is formed from an acid selected from the group consisting of hydrogen chloride, hydrogen bromide, hydrogen iodide, sulfuric acid, nitric acid, phosphoric acid, maleic acid, succinic acid, oxalic acid, citric acid, malic acid, tannic acid and gallic acid.

4. A chalcone derivative according to claim 1, wherein the group

is a piperazino group which has at least one substitutent selected from the group consisting of an alkyl group having 1 to 3 carbon atoms, a hydroxyalkyl group having 1 to 3 carbon atoms, phenyl group, a phenyl group substituted by a member selected from hydroxyl group, an alkoxy group having 1 to 3 carbon atoms and a halogen atom, benzyl group, a benzyl group substituted by a member selected from hydroxyl group, an alkoxy group having 1 to 3 carbon atoms and a halogen atom and formyl group.

5. 2 - [3 - (N′methylpiperazino)propoxy] - 4′-chlorochalcone.

6. 2-[3-(N′-methylpiperazino)propoxy) - 4′ - methoxychalcone.

7. 2-[2 - (N′-phenylpiperaziono)ethoxy] - 4′-methoxychalcone.

8. 2 - [2 - N′-phenylpiperaziono)ethoxy]-4′-methoxychalcone.

9. 2-(2-morpholinoethoxy)-4′-chlorochalcone.

10. 2-(3 - morpholinopropoxy) - 3′,4′,5′-trimethoxychalcone.

11. 2-[2 - (N′methylpiperazino)ethoxy] - 4′ - chlorochalcone.

12. 2 - {3 - [N′ - (2 - hydroxyethyl)piperazino]propoxy}-4′-methoxychalcone.

13. 4-[3-(N'-methylpiperazino)propoxy] - 4' - chlorochalcone.

14. 2-(2 - morpholinoethoxy)3',4',5' - trimethoxychalcone.

15. 2-(3-morpholinopropoxy)-4'-methoxychalcone.

References Cited
UNITED STATES PATENTS

| | | | |
|---|---|---|---|
| 3,250,767 | 5/1966 | Bencze | 260—240 R |
| 3,535,329 | 10/1970 | Griot | 260—240 J X |
| 3,535,330 | 10/1970 | Griot | 260—240 J X |
| 3,577,419 | 5/1971 | Griot | 260—240 J X |
| 3,622,588 | 11/1971 | Griot | 260—240 J X |
| 3,407,233 | 10/1968 | Packman | 260—570.7 |

OTHER REFERENCES

Rossi et al.: Am. J. Pharm., vol. 129, pp. 324–331 (1957).

Rossi et al.: J. Am. Pharm. Assoc., vol. 47, pp. 640–645 (1958).

Packman et al.: Am. J. Pharm., vol. 134, pp. 35–40 (1962).

Banerjee et al.: Chemical Abstracts, vol. 65, col. 20046 (1966) (abst. of J. Indian Chem. Soc., vol. 43, pp. 578–582 (1966)).

JOHN D. RANDOLPH, Primary Examiner

U.S. Cl. X.R.

260—343.2 R, 456, 570.7, 591, 600; 424—246, 248, 251, 267, 350